US012597081B2

(12) United States Patent
Varveropoulos et al.

(10) Patent No.: US 12,597,081 B2
(45) Date of Patent: Apr. 7, 2026

(54) OILFIELD DATA PRODUCT GENERATION AND MANAGEMENT SYSTEM

(71) Applicant: Schlumberger Technology Corporation, Sugar Land, TX (US)

(72) Inventors: Vassilis Varveropoulos, Houston, TX (US); Jatin Sablok, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/979,014

(22) Filed: Dec. 12, 2024

(65) Prior Publication Data

US 2025/0191085 A1     Jun. 12, 2025

Related U.S. Application Data

(60) Provisional application No. 63/608,879, filed on Dec. 12, 2023.

(51) Int. Cl.
G06Q 50/02     (2024.01)
G06Q 10/067    (2023.01)

(52) U.S. Cl.
CPC ........... G06Q 50/02 (2013.01); G06Q 10/067 (2013.01)

(58) Field of Classification Search
CPC ..... G06Q 50/02; G06Q 10/067; G06F 16/258

USPC ............................................................. 702/6
See application file for complete search history.

(56) References Cited

U.S. PATENT DOCUMENTS

| | | | |
|---|---|---|---|
| 2020/0082168 A1* | 3/2020 | Fathi | G06T 7/521 |
| 2022/0026594 A1 | 1/2022 | Mohanty | |
| 2023/0325369 A1 | 10/2023 | Paroha | |
| 2024/0044808 A1* | 2/2024 | Aljarro | G06N 3/08 |

* cited by examiner

*Primary Examiner* — Reginald R Reyes
(74) *Attorney, Agent, or Firm* — Jeffrey D. Frantz

(57) ABSTRACT

A method includes receiving input data from external data sources. The input data is received by a data product pipeline. The method also includes extracting a portion of the input data using the data product pipeline to produce extracted data. The method also includes transferring the extracted data from the data product pipeline to a data product raw storage. The method also includes receiving the input data directly from the external data sources. The method also includes transferring the extracted data and the input data from the data product raw storage back to the data product pipeline. The method also includes receiving data products. The method also includes transforming the input data, the extracted data, and the data products into transformed data using the data product pipeline. The method also includes transferring the transformed data to a data product artifact storage.

20 Claims, 8 Drawing Sheets

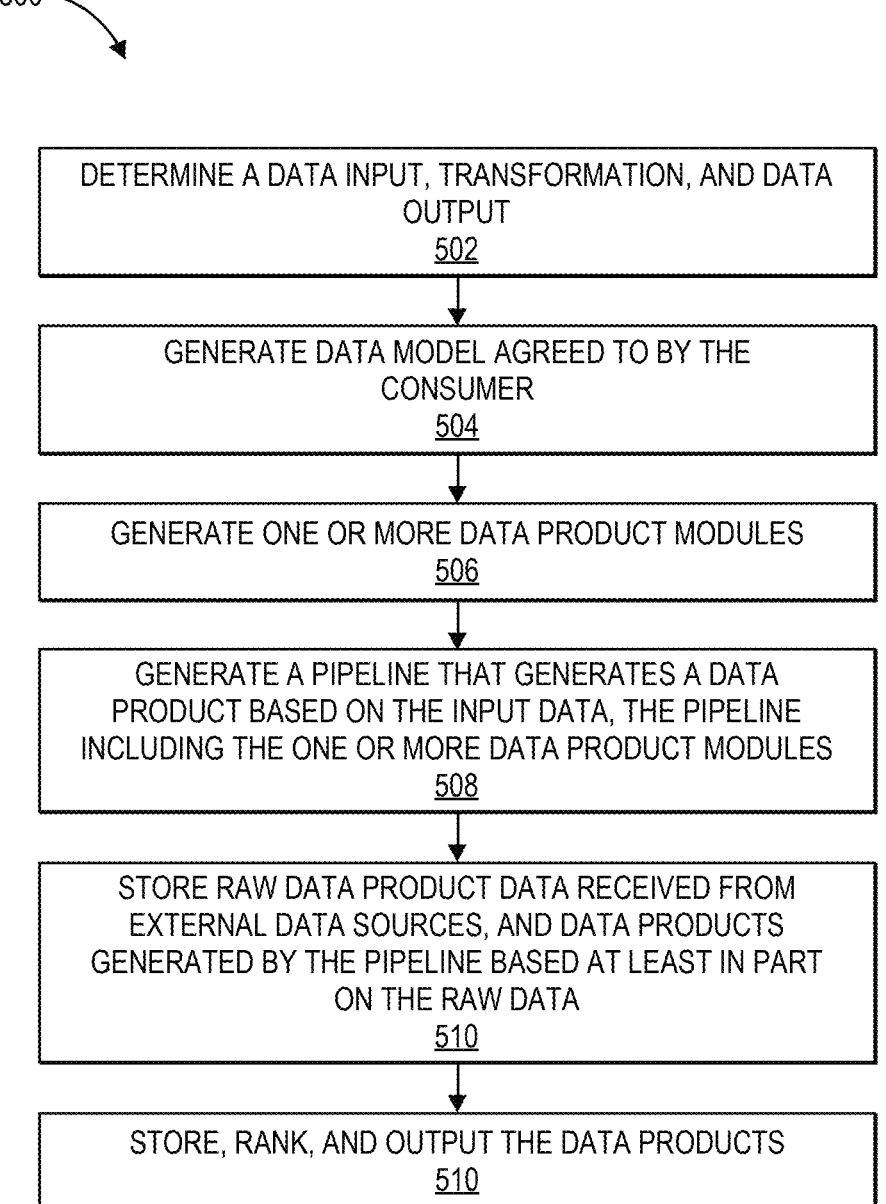

500

DETERMINE A DATA INPUT, TRANSFORMATION, AND DATA OUTPUT
502

GENERATE DATA MODEL AGREED TO BY THE CONSUMER
504

GENERATE ONE OR MORE DATA PRODUCT MODULES
506

GENERATE A PIPELINE THAT GENERATES A DATA PRODUCT BASED ON THE INPUT DATA, THE PIPELINE INCLUDING THE ONE OR MORE DATA PRODUCT MODULES
508

STORE RAW DATA PRODUCT DATA RECEIVED FROM EXTERNAL DATA SOURCES, AND DATA PRODUCTS GENERATED BY THE PIPELINE BASED AT LEAST IN PART ON THE RAW DATA
510

STORE, RANK, AND OUTPUT THE DATA PRODUCTS
510

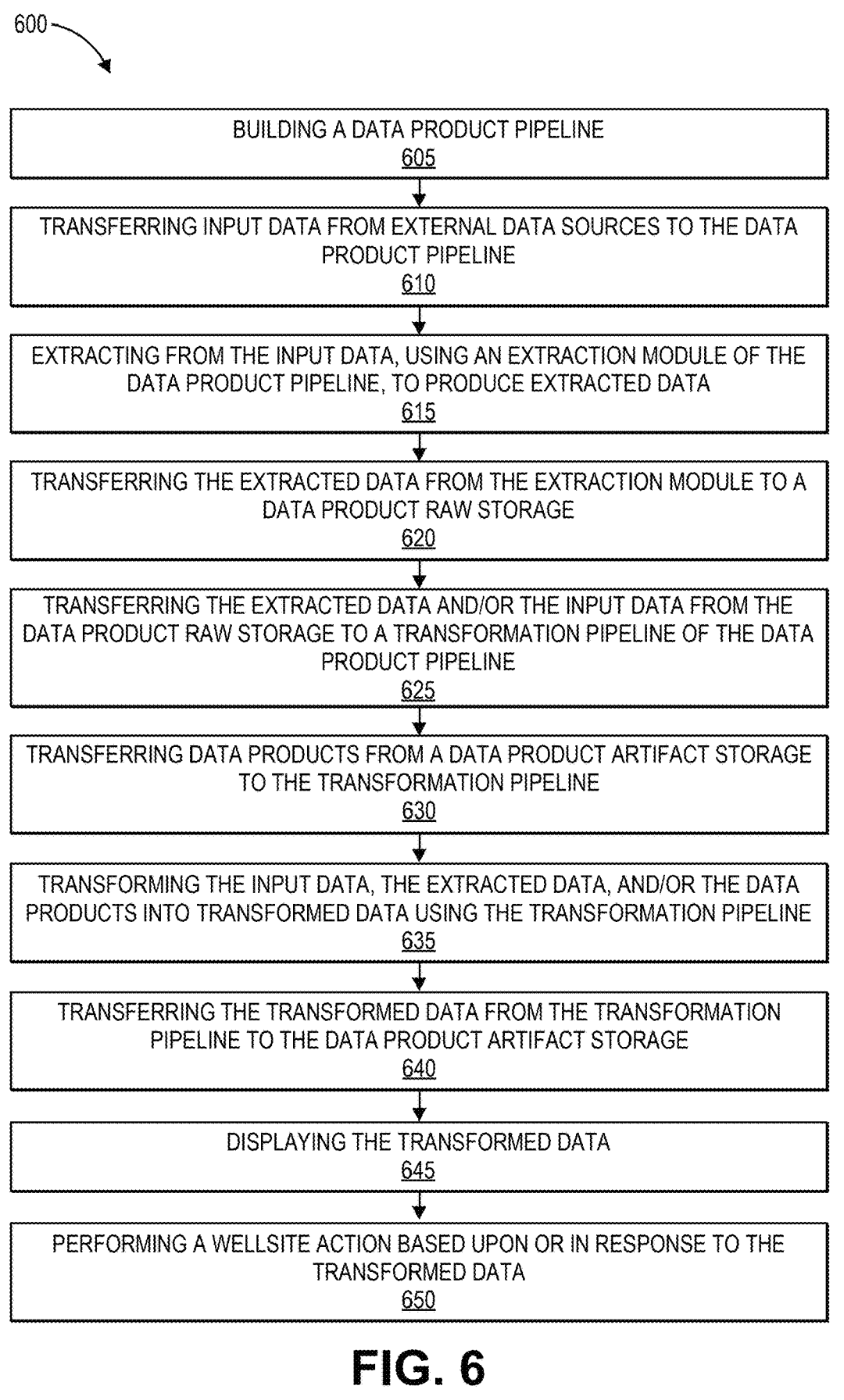

```
┌─────────────────────────────────────────────────────────┐
│              BUILDING A DATA PRODUCT PIPELINE             │
│                           605                            │
└─────────────────────────────────────────────────────────┘
                            │
                            ▼
┌─────────────────────────────────────────────────────────┐
│  TRANSFERRING INPUT DATA FROM EXTERNAL DATA SOURCES TO    │
│             THE DATA PRODUCT PIPELINE                     │
│                           610                            │
└─────────────────────────────────────────────────────────┘
                            │
                            ▼
┌─────────────────────────────────────────────────────────┐
│  EXTRACTING FROM THE INPUT DATA, USING AN EXTRACTION      │
│  MODULE OF THE DATA PRODUCT PIPELINE, TO PRODUCE          │
│             EXTRACTED DATA                                │
│                           615                            │
└─────────────────────────────────────────────────────────┘
                            │
                            ▼
┌─────────────────────────────────────────────────────────┐
│  TRANSFERRING THE EXTRACTED DATA FROM THE EXTRACTION      │
│  MODULE TO A DATA PRODUCT RAW STORAGE                     │
│                           620                            │
└─────────────────────────────────────────────────────────┘
                            │
                            ▼
┌─────────────────────────────────────────────────────────┐
│  TRANSFERRING THE EXTRACTED DATA AND/OR THE INPUT DATA    │
│  FROM THE DATA PRODUCT RAW STORAGE TO A TRANSFORMATION    │
│  PIPELINE OF THE DATA PRODUCT PIPELINE                    │
│                           625                            │
└─────────────────────────────────────────────────────────┘
                            │
                            ▼
┌─────────────────────────────────────────────────────────┐
│  TRANSFERRING DATA PRODUCTS FROM A DATA PRODUCT           │
│  ARTIFACT STORAGE TO THE TRANSFORMATION PIPELINE          │
│                           630                            │
└─────────────────────────────────────────────────────────┘
                            │
                            ▼
┌─────────────────────────────────────────────────────────┐
│  TRANSFORMING THE INPUT DATA, THE EXTRACTED DATA, AND/OR  │
│  THE DATA PRODUCTS INTO TRANSFORMED DATA USING THE        │
│  TRANSFORMATION PIPELINE                                  │
│                           635                            │
└─────────────────────────────────────────────────────────┘
                            │
                            ▼
┌─────────────────────────────────────────────────────────┐
│  TRANSFERRING THE TRANSFORMED DATA FROM THE               │
│  TRANSFORMATION PIPELINE TO THE DATA PRODUCT ARTIFACT     │
│             STORAGE                                       │
│                           640                            │
└─────────────────────────────────────────────────────────┘
                            │
                            ▼
┌─────────────────────────────────────────────────────────┐
│              DISPLAYING THE TRANSFORMED DATA              │
│                           645                            │
└─────────────────────────────────────────────────────────┘
                            │
                            ▼
┌─────────────────────────────────────────────────────────┐
│  PERFORMING A WELLSITE ACTION BASED UPON OR IN RESPONSE   │
│             TO THE TRANSFORMED DATA                       │
│                           650                            │
└─────────────────────────────────────────────────────────┘
```

FIG. 6

OILFIELD DATA PRODUCT GENERATION AND MANAGEMENT SYSTEM

CROSS-REFERENCE TO RELATED APPLICATIONS

This patent application claims priority to U.S. Provisional Patent Application No. 63/608,879, filed on Dec. 12, 2023, which is incorporated by reference.

BACKGROUND

Oilfield entities (e.g., drillers, owners, service companies, operators, etc.) rely on data collected at their wellsite, as well as at other wells, oilfields, etc., to prepare oilfield plans and execute operations efficiently. The generation of data models, based on disparate data sources, and the implementation and storage of data products generated (e.g., using the data models and based on the different sources) may be a challenge.

Moreover, data modeling and analysis is often accomplished by a combination of domain experts (e.g., geologists, data scientists, etc.) and software applications experts. This relies on effective communication of arcane, complex information about data types and desired outputs between these two groups, and these two groups may have non-overlapping areas of expertise. Accordingly, "democratizing" the process, whereby the data experts have enhanced or direct control over the application development, without calling for the domain experts to also become software experts, is desirable.

SUMMARY

A method is disclosed. The method includes receiving input data from external data sources. The input data is received by a data product pipeline. The method also includes extracting a portion of the input data using the data product pipeline to produce extracted data. The method also includes transferring the extracted data from the data product pipeline to a data product raw storage. The method also includes receiving the input data directly from the external data sources. The input data is received by the data product raw storage. The method also includes transferring the extracted data and the input data from the data product raw storage back to the data product pipeline. The method also includes receiving data products. The data products are received by the data product pipeline. The method also includes transforming the input data, the extracted data, and the data products into transformed data using the data product pipeline. The method also includes transferring the transformed data to a data product artifact storage. The method also includes providing the transformed data from the data product artifact storage to a user.

A computing system is also disclosed. The computing system includes one or more processors and a memory system. The memory system includes one more non-transitory computer-readable media storing instructions that, when executed by at least one of the one or more processors, cause the computing system to perform operations. The operations include receiving input data from external data sources. The input data is received by a data product pipeline. The input data is received by an extraction pipeline of the data product pipeline. The input data includes seismic data and/or downhole data that is captured by a downhole tool in a wellbore. The downhole data comprises measurement-while-drilling parameters and/or logging-while-drilling parameters. The operations also include extracting a portion of the input data using the extraction module to produce extracted data. The extracted data is extracted based upon one or more user-defined parameters. The operations also include transferring the extracted data to a data product raw storage. The operations also include transferring the extracted data and the input data from the data product raw storage back to the data product pipeline. The extracted data and the input data are transferred from the data product raw storage to a transformation pipeline of the data product pipeline. The operations also include transferring data products to the data product pipeline. The data products are transferred from a data product artifact storage to the transformation pipeline of the data product pipeline. The operations also include transforming the input data, the extracted data, and the data products into transformed data using the transformation pipeline. The operations also include transferring the transformed data to the data product artifact storage. The operations also include providing the transformed data from the data product artifact storage to a user.

A non-transitory computer-readable medium is also disclosed. The medium stores instructions that, when executed by one or more processors of a computing system, causing the computing system to perform operations. The operations include building a data product pipeline using a wellsite operations data foundation (WODF). A data product developer creates and implements changes to the data produce pipeline. A WODF developer prepares elements that are to be used by the data product developer. A data product operator maintains a model of the data product pipeline. A data product quality assurance (QA) controller tests, identifies, and corrects problems with a functionality of the data product pipeline. The operations also include receiving input data from external data sources. The input data is received by the data product pipeline. The input data is received by an extraction pipeline of the data product pipeline. The input data includes seismic data and downhole data that is captured by a downhole tool in a wellbore. The downhole data includes measurement-while-drilling parameters and/or logging-while-drilling parameters. The external data sources include an oilfield analytics, planning, and management software, a unified data service, and an open subsurface data universe. The operations also include extracting a portion of the input data using the extraction module to produce extracted data. The extracted data is extracted based upon one or more user-defined parameters. The operations also include transferring the extracted data to a data product raw storage. The data product raw storage also receives the input data directly from the external data sources. The operations also include transferring the extracted data and the input data from the data product raw storage back to the data product pipeline. The extracted data and the input data are transferred from the data product raw storage to a transformation pipeline of the data product pipeline. The operations also include transferring data products to the data product pipeline. The data products are transferred from a data product artifact storage to the transformation pipeline of the data product pipeline. The data products are developed by a domain expert rather than a software coding expert. The data products implement custom code for performing one or more functions. The operations also include transforming the input data, the extracted data, and the data products into transformed data using the transformation pipeline. The operations also include transferring the transformed data to the data product artifact storage. The operations also include providing the transformed data from the data product artifact storage to a user.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate examples of the present teachings and together with the description, serve to explain the principles of the present teachings. In the figures:

FIG. 5 illustrates a flowchart of a method for generating and deploying data products, according to an example.

FIG. 6 illustrates a flowchart of another method for generating and deploying data products, according to an example.

DETAILED DESCRIPTION

Reference will now be made in detail to examples, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the examples.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular examples and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some examples. Some operations in the processing procedures, methods, techniques, and workflows disclosed herein may be combined and/or the order of some operations may be changed.

Figure 1:
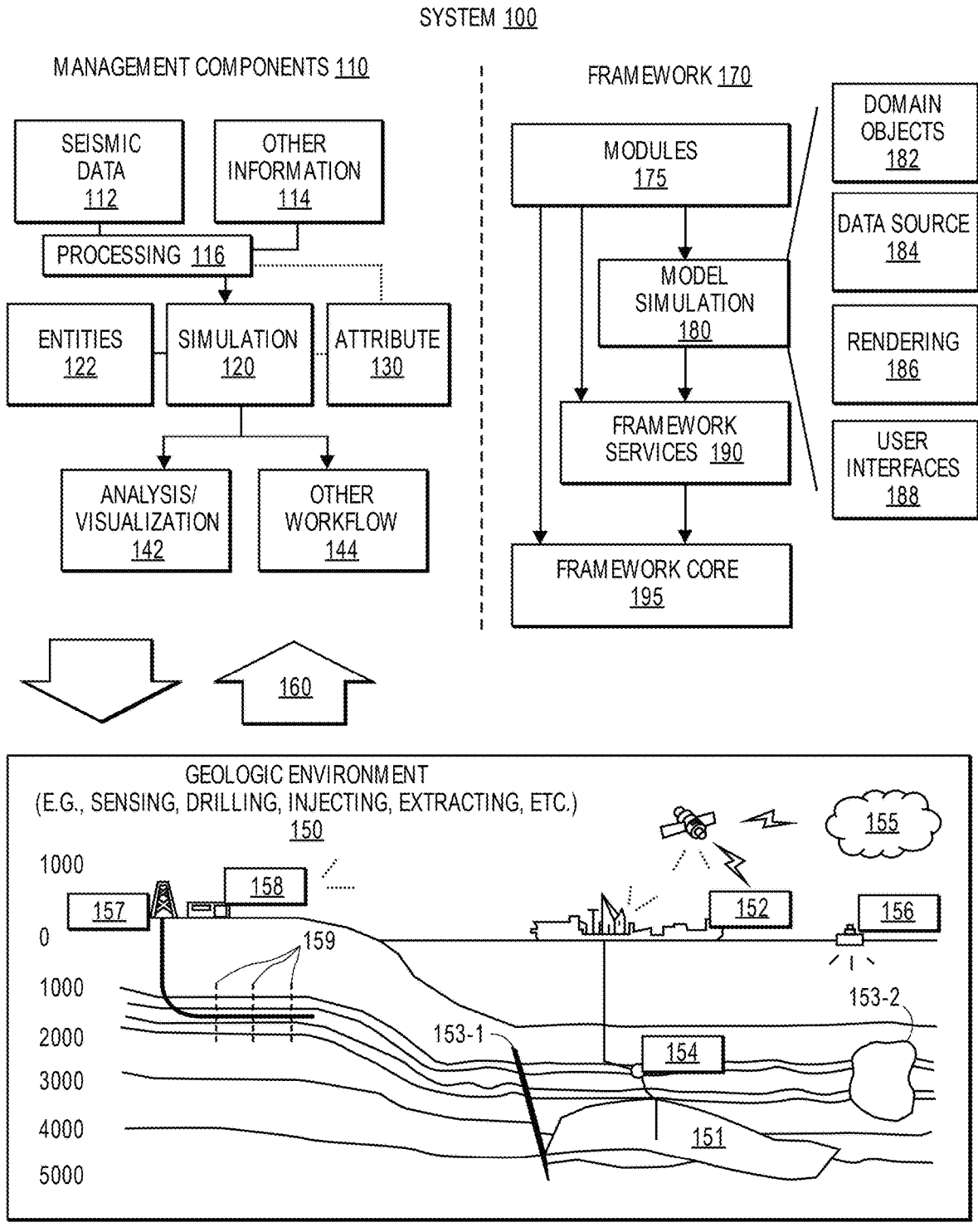
FIG. 1 illustrates a system that includes various management components to manage various aspects of a geologic environment, according to an example.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example, the simulation component 120 may rely on entities 122. Entities 122 may include earth entities or geological objects such as wells, surfaces, bodies, reservoirs, etc. In the system 100, the entities 122 may include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes may be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB Limited, Houston Texas), the INTERSECT™ reservoir simulator (SLB Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example, the management components 110 may include features of a commercially available framework such as the PETREL® seismic to simulation software framework (SLB Limited, Houston, Texas). The PETREL® framework provides components that allow for optimization of exploration and development operations. The PETREL® framework includes seismic simulation software components that may output information for use in increasing reservoir performance, for example, by improving asset team productivity. Through use of such a framework, various professionals (e.g., geophysicists, geologists, and reservoir engineers) may develop collaborative workflows and integrate operations to streamline processes. Such a framework may be considered an application and may be considered a data-driven application (e.g., where data is input for purposes of modeling, simulating, etc.).

In an example, various aspects of the management components 110 may include add-ons or plug-ins that operate according to specifications of a framework environment. For example, a commercially available framework environment marketed as the OCEAN® framework environment (SLB Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example, the PETREL® software may be considered a data-driven application. The PETREL® software may include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications may display their data while the user interfaces 188 may provide a common look and feel for application user interface components.

As an example, the domain objects 182 may include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project may be accessed and restored using the model simulation layer 180, which may recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Oilfield Data Product Generation and Management System

Figure 2:
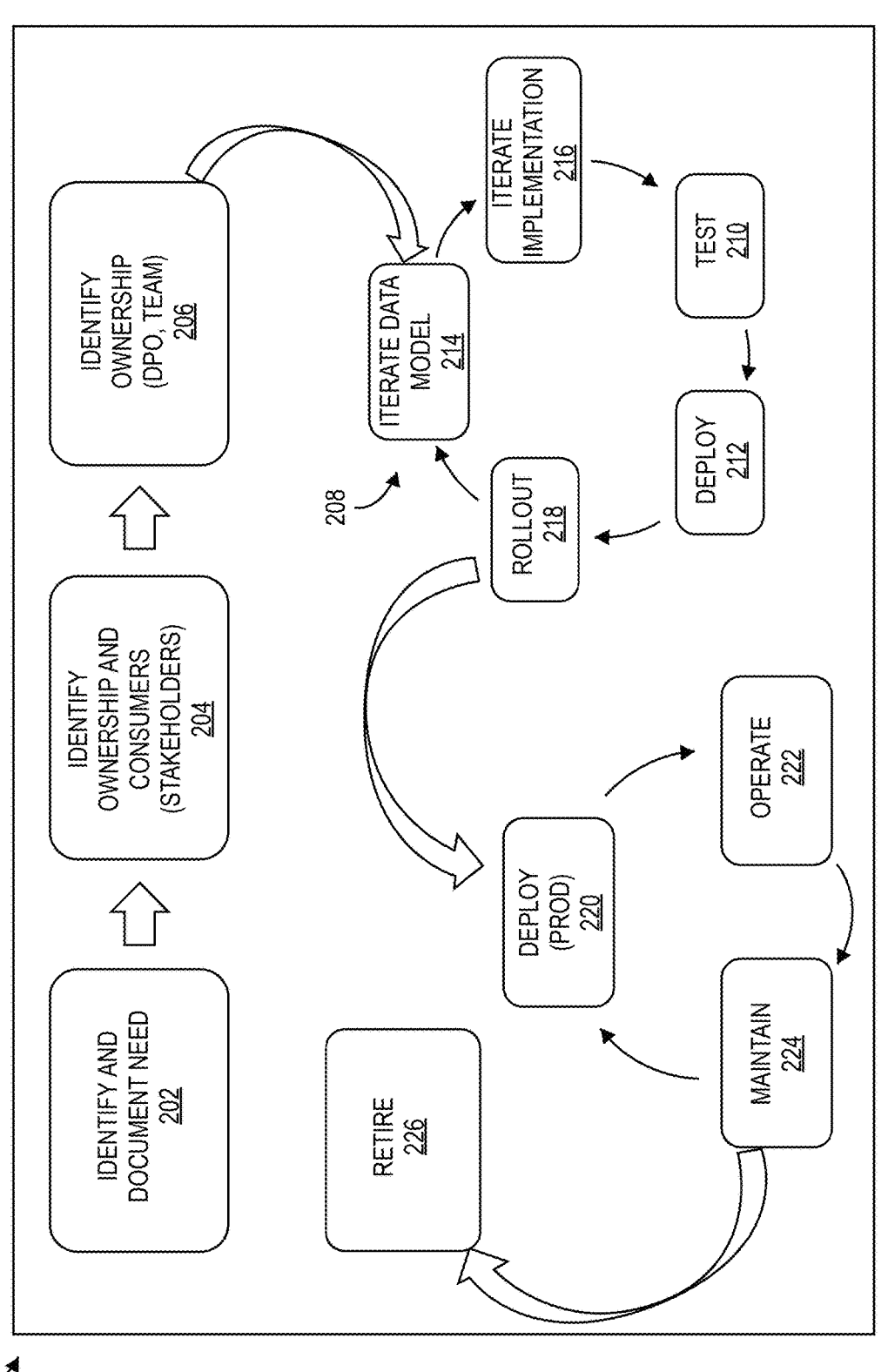
FIG. 2 illustrates a lifecycle of a data product, according to an example.

FIG. 2 illustrates a flowchart of a lifecycle 200 of a data product, according to an example. In general, a data product is a data object that is capable of receiving data, transforming the data, and storing the data in a predefined format identified (e.g., by an end-user). The data product may be developed by domain (e.g., of the data) experts rather than software coding experts, for example, utilizing artificial intelligence, APIs, off-the-shelf code units, etc., to perform the ingestion, transformation, storage, retrieval, and output functions, designed at a functional level by the domain experts. In some examples, the data products may implement custom code for one or more functions. The data products may be trustworthy, truthful, accessible, understandable, discoverable, or any combination thereof.

Referring specifically to FIG. 2, the lifecycle 200 includes identifying and documenting a "need" 202 (e.g., a desired objective) for such a data product. Generally, this may include identification of the raw input data, what processing to do for the data, and how to retrieve and output the data. Next, the ownership and consumers (e.g., stake holders) may be identified 204, and further, ownership may be identified 206. The partitioning of roles may permit more efficient formatting, storage, display, etc.

A data model for the data product may be generated, and iterated and reiterated through a first loop 208. This may include testing 210, deploying 212, iterating the model 214, and iterating the data product implementation 216, etc., until a rollout 218 of the model is ready. The product may then be deployed 220, operated 222, and maintained 224, until it reaches the end of its usefulness and may be retired 226. This may be accomplished automatically via the platform, e.g., without human intervention.

Data Product Development Environment

Figure 3A:
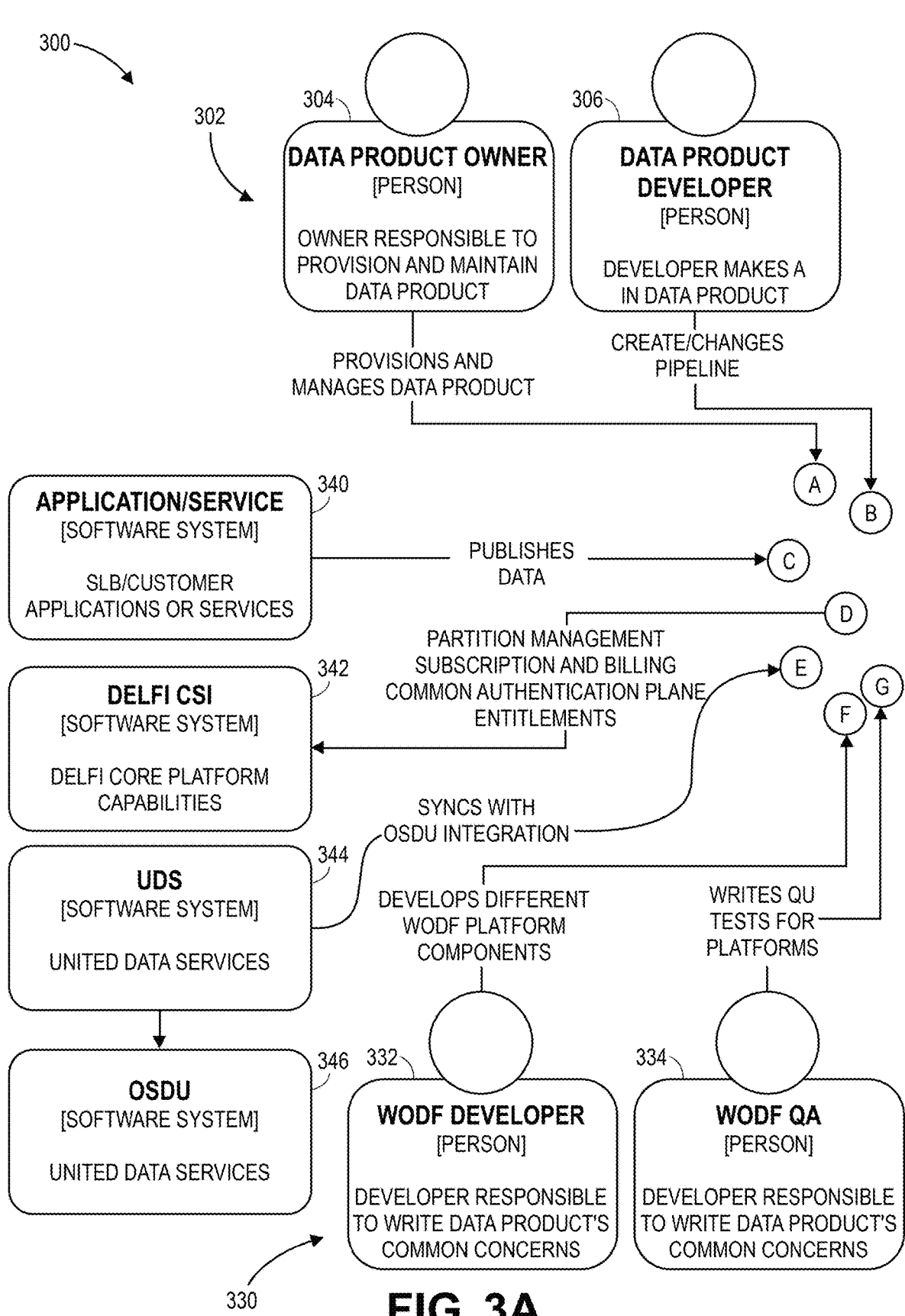
FIGS. 3A and 3B illustrate a schematic view of an environment for developing and deploying data products, according to an example.
Figure 3B:
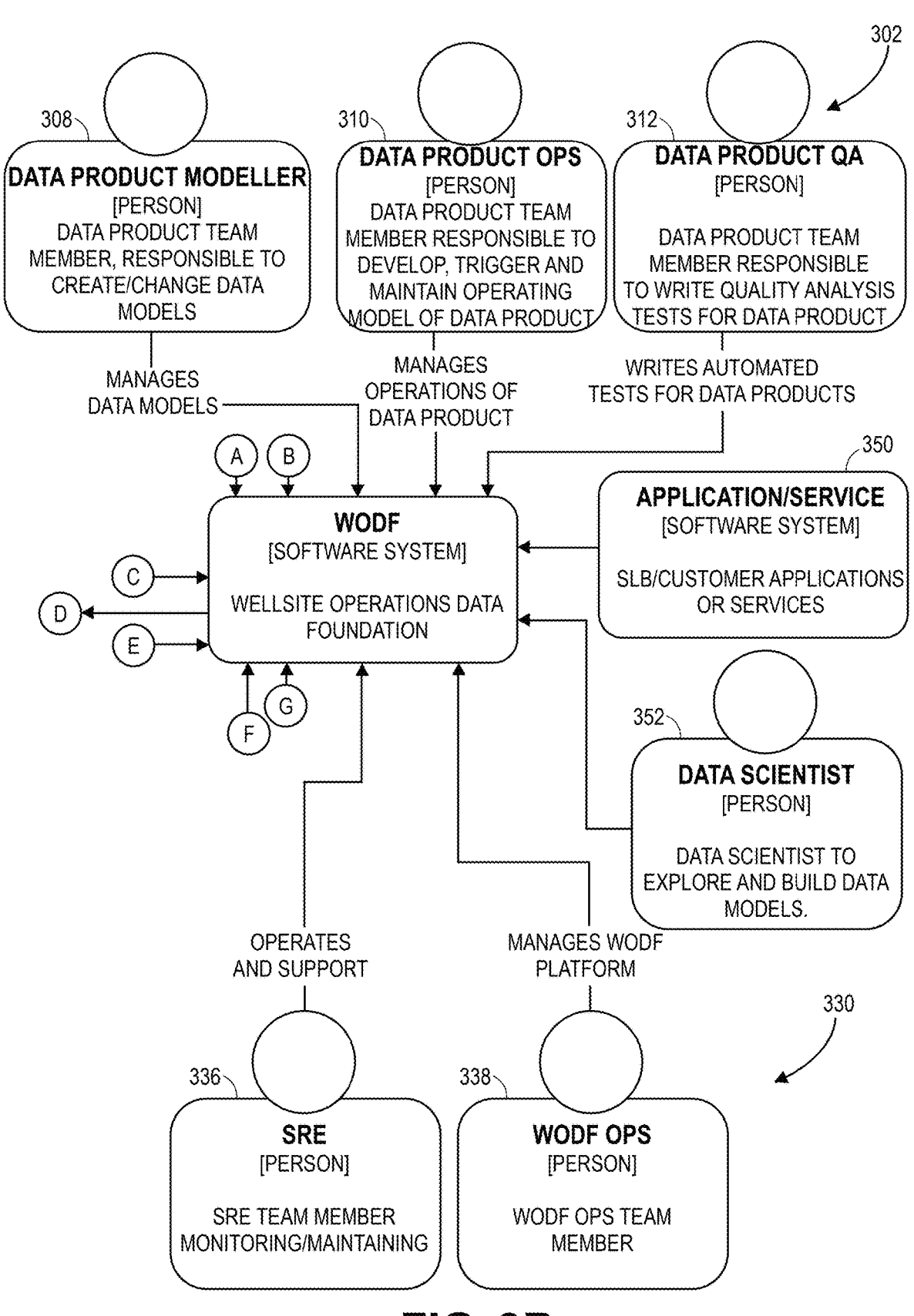

FIGS. 3A and 3B illustrate a data product development environment 300, according to an example. The environment generally includes a data product team 302, which may include one or more data product owners 304. The data product owners 304 may be responsible to provision and maintain the data product. The environment 300 may also include a data product developer 306, who may create and implement changes to a data product pipeline (as will be discussed below with reference to FIG. 4). A data product modeler 308 may change/update the model, which may be implemented to change the data product, for example. Further, a data product operator 310 may develop, trigger, and maintain the operating model of the data product, while a data product quality assurance controller 312 may test and analyze operation of the product.

Each of these data product roles may communicate with a wellsite operations data foundation (WDOF) 320. The WODF 320 may be the platform that permits building of the pipelines and storage of the data products. The WODF 320 may be implemented by a WODF team 330, which may include a WODF developer 332 may prepare elements that are expected to be used frequently by data product developers, and may provide them (e.g., in a library, to the WODF 320). A WODF quality assurance (QA) engineer 334 may identify and correct concerns with the WODF functionality. A site reliability engineer (SRE) 336 may monitor and maintain the operation of the WODF 320, and a WODF operations personnel 338 may provide operational assistance for the WODF and use thereof by the data product team.

The WODF 320 may interact with one or more other software systems, for example, consumer applications 340, oilfield analytics, planning, and management software (e.g., DELFI®) 342, unified data services 344, open-source, industry-specific development platforms (e.g., Open Subsurface Data Universe (OSDU)), 346 etc. For example, applications and services 348 may publish data to the WODF 320. WODF 320 may push partition management, subscriptions, authentication, and entitlements to DELFI 342. The UDS 344 may sync with OSDU integration, and the OSDU may permit acquisition and analysis of oilfield information. On the right side of the figure, the application/service entit(ies) 350 and/or data scientists 352 may provide data to the WODF 320 for consumption, i.e., the raw input data.

Data Product

Figure 4:
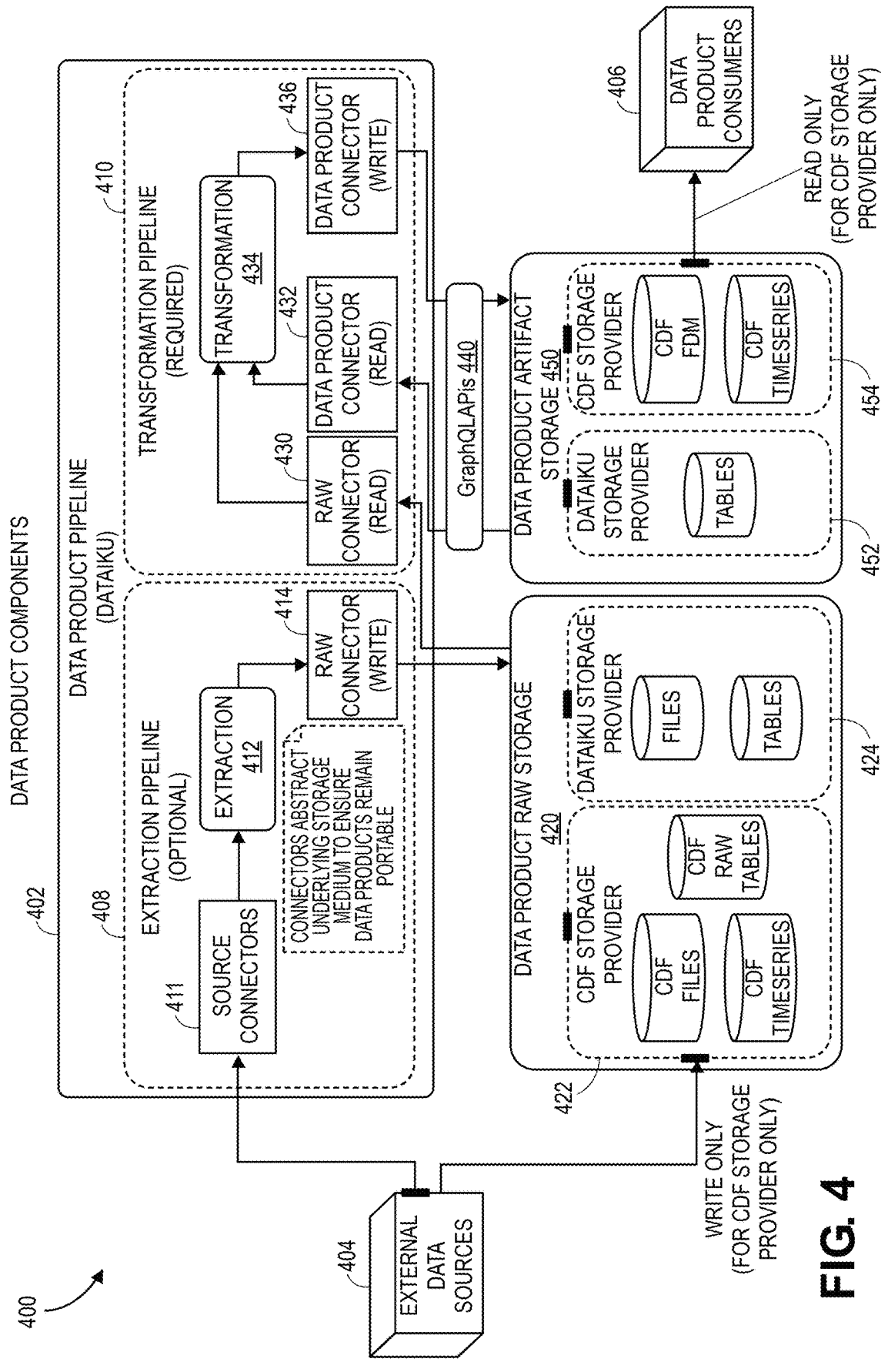
FIG. 4 illustrates a schematic view of a data product, according to an example.

FIG. 4 illustrates a schematic view of a data product 400, according to an example. The data product 400 may include a data product pipeline 402, which may receive data from external data sources 404 and provide the data product to data product consumers 406. The data product pipeline 402 may generally include one or more pipeline elements 408, 410. For example, the pipeline element 408 may be an extraction pipeline, which may include one or more source connectors 411 configured to receive the data from the external data sources 404. Such connectors may receive, for example, abstracted data that is agnostic to formatting, platform, etc., and provide it in a format that is usable for other components of the pipeline. The pipeline element 408 may also include an extraction module 412, which may extract data according to one or more parameters from the raw data that is input. The extraction module 412 may feed the extracted data to a raw connector 414, which may again abstract the data so it may remain portable.

The raw data from the connector 414 may feed to a data product raw storage 420, as shown. The data product raw storage 420 may also receive raw data directly from the external data sources 404. The data product raw storage 420 may include a CDF storage 422, which may include one or more databases for storing CDF data from the external data sources 404. The data product raw storage 420 may also include a Dataiku storage provider 424, which may include one or more databases for storage of files and/or tables.

The data product raw storage 420 may feed data to the second pipeline element 410, which may be a transformation pipeline. The transformation pipeline 410 may include a raw connector 430, which may receive the data (e.g., responsive to a call or via a push) from the data product raw storage 420. The transformation pipeline 410 may also include a data product connector 432, which may receive data products from a data product artifact storage 450, as will be described below. A transformation module 434 may ingest both the raw data and the data products received therein and produce transformed data. The transformed data may be fed to a data product connector 436, which may be again connected to the data product artifact storage 450.

The data product 400 may include one or more APIs 440, which may control and permit the searching for, passing of, and storage of data products in the data product artifact storage 450. The data product artifact storage 450 may include a Dataiku storage provider 452 and a CDF storage provider 454. The data products, including the transformed data, may be stored in these providers 452, 454 and provided to the data product consumers 406.

Exemplary Method

FIG. 5 illustrates a flowchart of a method 500 for generating and implementing data products, according to an example. The method 500 includes determining a data input, transformation, and data output, as at 502. The method 500 includes generating a data model agreed to by a consumer of the data, as at 504. The method 500 also includes generating one or more data product modules, as at 506. The data product modules may be connectors, functions, extraction modules, transformation modules, etc. The method 500 may also include generating a pipeline that generates a data product based on the input data, the one or more of the data product modules, and/or the pipeline, as at 508. The pipelines may be generated, for example, without writing code, but through a visual program builder, but in other examples, may permit or rely on code writing.

The method 500 may include storing raw data generated by external data sources, as well as data products, models, etc., generated using the pipeline and based at least in part on the data from the external data sources, as at 510. The method 500 may include storing and ranking the data products after use, and the data products may also be provided to external data consumers, as at 512. Accessibility by external sources or within the various pipelines to the data product storage may be determined based on governance (e.g., entitlements) regimes. Further, the data products may be ranked based on components, frequency of use, relevance to a particular pipeline/project and may be searchable.

Another Exemplary Method

FIG. 6 illustrates a flowchart of another method 600 for generating and implementing data products, according to an embodiment. An illustrative order of the method 600 is provided below; however, one or more portions of the method 600 may be performed in a different order, simultaneously, repeated, or omitted. At least a portion of the method 600 may be performed with a computing system 700 (described below).

The method 600 may include building a data product pipeline, as at 605. The data product pipeline may be built using a wellsite operations data foundation (WODF). A data product developer may create and/or implement changes to the data produce pipeline. A WODF developer may prepare elements that are to be used by the data product developer. A data product operator may maintain a model of the data product pipeline. A data product quality assurance (QA) controller may test, identify, and/or correct problems with a functionality of the data product pipeline.

The method 600 may also include receiving input data from external data sources, as at 610. The input data may be received by the data product pipeline. The input data may be received by an extraction pipeline of the data product pipeline. The input data may be or include seismic data, surface data, and/or downhole data. The downhole data may be captured by a downhole tool in a wellbore. For example, the downhole data may be or include measurement-while-drilling parameters and/or logging-while-drilling parameters. The external data sources may be or include an oilfield analytics, planning, and management software, a unified data service, and/or an open subsurface data universe.

The method 600 may also include extracting from the input data using the extraction module to produce extracted data, as at 615. The extracted data may be extracted based upon one or more user-defined parameters.

The method 600 may also include transferring the extracted data to a data product raw storage, as at 620. The data product raw storage may also receive the input data (e.g., directly) from the external data sources.

The method 600 may also include transferring the extracted data and/or the input data from the data product raw storage back to the data product pipeline, as at 625. The extracted data and/or the input data may be transferred from the data product raw storage to a transformation pipeline of the data product pipeline.

The method 600 may also include transferring data products to the data product pipeline, as at 630. The data products may be transferred from a data product artifact storage to the transformation pipeline of the data product pipeline. The data products may be developed by a domain expert rather than a software coding expert. The data products may implement custom code for performing one or more functions.

The method 600 may also include transforming the input data, the extracted data, and/or the data products into transformed data using the transformation pipeline, as at 635.

The method 600 may also include transferring the transformed data to the data product artifact storage, as at 640.

The method 600 may also include displaying the transformed data, as at 645.

The method 600 may also include performing a wellsite action based upon or in response to the transformed data, as at 650. The wellsite action may be or include generating and/or transmitting a signal that instructs or causes a physical action to occur at a wellsite, The physical action may be or include selecting where to drill the wellbore, drilling the wellbore, varying a weight and/or torque on a drill bit that is drilling the wellbore, varying a drilling trajectory of the wellbore, or varying a concentration and/or flow rate of a fluid pumped into the wellbore.

Exemplary Computing System

Figure 7:
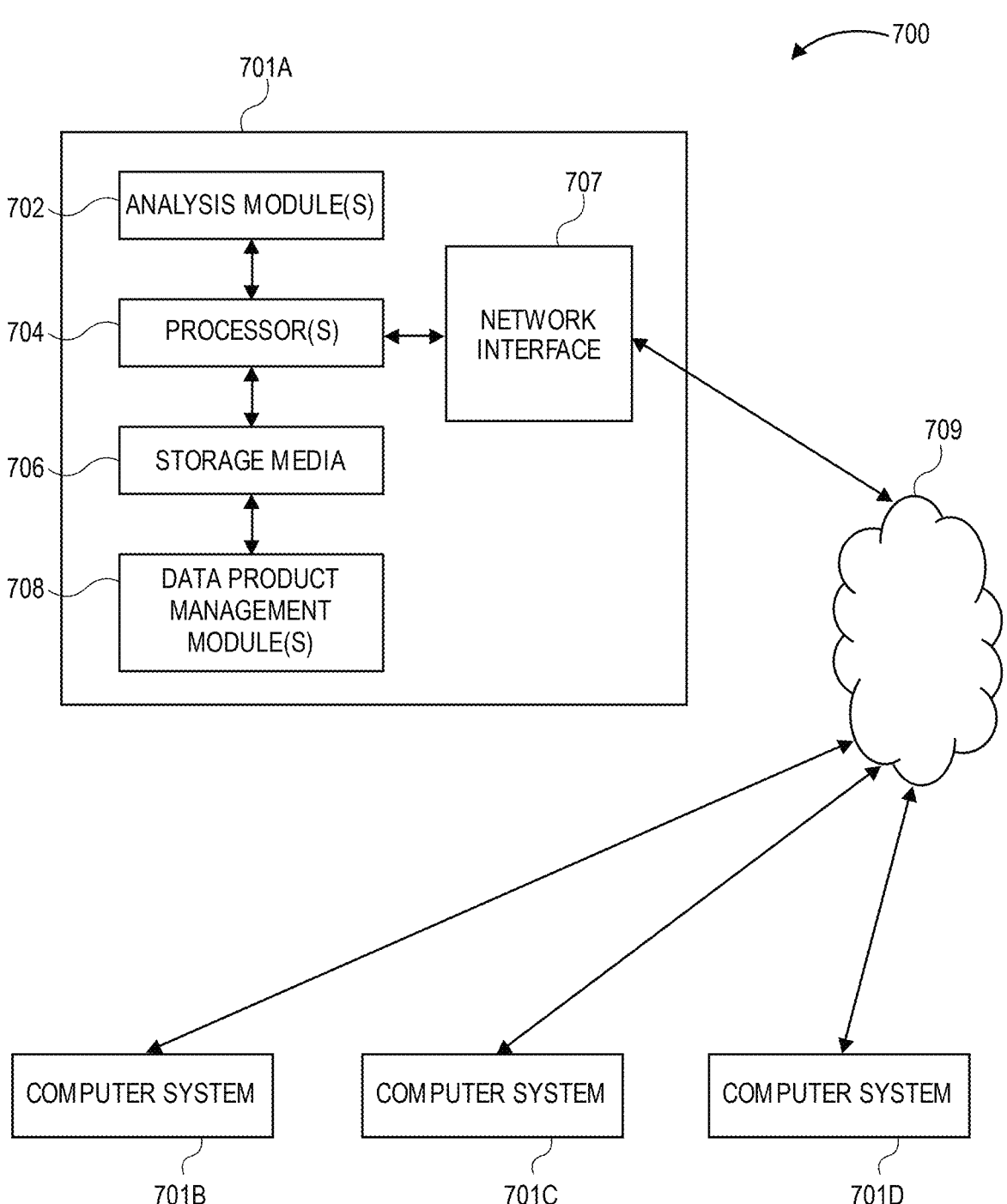
FIG. 7 illustrates a schematic view of a computing system for performing at least a portion of one or more of the methods described herein, according to an example.

In some examples, the methods of the present disclosure may be executed by a computing system. FIG. 7 illustrates an example of such a computing system 700, in accordance with some examples. The computing system 700 may include a computer or computer system 701A, which may be an individual computer system 701A or an arrangement of distributed computer systems. The computer system 701A includes one or more analysis modules 702 that are configured to perform various tasks according to some examples, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example of FIG. 7 storage media 706 is depicted as within computer system 701A, in some examples, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some examples, computing system 700 contains one or more data product management module(s) 708. In the example of computing system 700, computer system 701A includes the data product management module 708. In some examples, a single data product management module may be used to perform some aspects of one or more examples of the methods disclosed herein. In other examples, a plurality of data product management modules may be used to perform some aspects of methods herein.

It should be appreciated that computing system 700 is merely one example of a computing system, and that computing system 700 may have more or fewer components than shown, may combine additional components not depicted in the example of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the sub-surface three-dimensional geologic formation under consideration.

The foregoing description, for purpose of explanation, has been described with reference to specific examples. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The examples were chosen and described in order to best explain the principles of the disclosure and its practical applications, to thereby enable others skilled in the art to best utilize the disclosed examples and various examples with various modifications as are suited to the particular use contemplated.

What is claimed is:

1. A method, comprising:

receiving input data from one or more external data sources via a data product pipeline, wherein the input data is associated with a well in a subsurface region, wherein the data product pipeline comprises an extraction pipeline and a transformation pipeline, and wherein the extraction pipeline comprises:

a source connector configured to modify a format of the input data to generate modified input data;

an extraction component configured to extract a portion of the modified input data to produce extracted data; and a raw connector component configured to receive the extracted data and modify the extracted data based on one or more portability parameters to generate modified extracted data;

transferring the modified extracted data from the extraction pipeline to a data product raw storage, wherein the data product raw storage is configured to store the modified extracted data in a common data format (CDF) storage;

storing the input data received directly from the one or more external data sources in the data product raw storage, wherein the data product raw storage is configured to store the input data in the CDF storage;

transferring the modified extracted data and the input data from the data product raw storage to the transformation pipeline of the data product pipeline, wherein the transformation pipeline is configured to:

receive one or more data products from a data product artifact storage, wherein the one or more data products correspond to a pre-defined format associated with a data domain to perform data ingestion, data transformation, data storage, data retrieval, and data output functions using one or more application programming interfaces (APIs) associated with the data domain;

transform the input data and the modified extracted data into transformed data based on the one or more data products; and transfer the transformed data to the data product artifact storage;

determining one or more properties associated with the well in a subsurface region of the earth based on the transformed data; and adjusting one or more operations of equipment associated with the well based on the one or more properties, wherein the one or more operations of the equipment are adjusted to vary a torque on a drill bit drilling the well.

2. The method of claim 1, wherein the input data is received by the extraction pipeline of the data product pipeline.

3. The method of claim 1, wherein the input data comprises seismic data and/or downhole data.

4. The method of claim 3, wherein the input data comprises the downhole data including measurement-while-drilling parameters and/or logging-while-drilling parameters, and wherein the downhole data is captured by a downhole tool of the well.

5. The method of claim 1, wherein the one or more external data sources comprise an oilfield analytics, planning, and management software, a unified data service, an open subsurface data universe, or any combination thereof.

6. The method of claim 1, comprising adjusting one or more additional operations of the equipment to vary a weight on the drill bit drilling the well.

7. The method of claim 1, comprising adjusting one or more additional operations of the equipment to vary a drilling trajectory of the well.

8. The method of claim 1, comprising adjusting one or more additional operations of the equipment to vary a concentration, flow rate, or both of a fluid being pumped into the well.

9. The method of claim 1, wherein the data product pipeline is generated using a wellsite operations data foundation (WODF).

10. The method of claim 1, further comprising displaying a visual representation of the transformed data to a user.

11. The method of claim 1, wherein the extraction component is configured to extract data based on one or more user-defined parameters.

12. The method of claim 11, wherein the one or more user-defined parameters comprise information related to a role of a user.

13. A computing system, comprising:

one or more processors; and a memory system comprising one more non-transitory computer-readable media storing instructions that, when executed by at least one of the one or more processors, cause the computing system to perform operations, the operations comprising:

receiving input data from one or more external data sources via a data product pipeline, wherein the input data comprises seismic data and/or downhole data that is captured by a downhole tool in a wellbore of a well, wherein the downhole data comprises measurement-while-drilling parameters and/or logging-while-drilling parameters, and wherein the data product pipeline comprises an extraction pipeline and a transformation pipeline wherein the extraction pipeline comprises:

a source connector configured to modify a format of the input data to generate modified input data;

an extraction component configured to extract a portion of the modified input data to produce extracted data, wherein the extracted data is extracted based upon one or more user-defined parameters; and a raw connector component configured to receive the extracted data and modify the extracted data based on one or more portability parameters to generate modified extracted data;

transferring the modified extracted data from the extraction pipeline to a data product raw storage, wherein the data product raw storage is configured to store the modified extracted data in a common data format (CDF) storage;

storing the input data received directly from the one or more external data sources in the data product raw storage, wherein the data product raw storage is configured to store the input data in the CDF storage;

transferring the modified extracted data and the input data from the data product raw storage to the transformation pipeline of the data product pipeline, wherein the transformation pipeline is configured to:

receive one or more data products from a data product artifact storage, wherein the one or more data products correspond to a pre-defined format associated with a data domain to perform data ingestion, data transformation, data storage, data retrieval, and data output functions using one or more application programming interfaces (APIs) associated with the data domain;

transform the input data and the modified extracted data into transformed data based on the one or more data products; and transfer the transformed data to the data product artifact storage;

determining one or more properties associated with the wellbore in a subsurface region of the earth based on the transformed data; and adjusting one or more operations of equipment associated with the wellbore based on the one or more properties, wherein the one or more operations of the equipment are adjusted to vary a torque on a drill bit drilling the wellbore.

14. The computing system of claim 13, wherein the operations further comprise building the data product pipeline using a wellsite operations data foundation (WODF), wherein a data product developer creates and implements changes to the data produce pipeline, wherein a WODF developer prepares elements that are to be used by the data product developer, wherein a data product operator maintains a model of the data product pipeline, and wherein a data product quality assurance (QA) controller tests, identifies, and corrects problems with a functionality of the data product pipeline.

15. The computing system of claim 13, wherein the one or more external data sources comprise an oilfield analytics, planning, and management software, a unified data service, and an open subsurface data universe.

16. The computing system of claim 13, wherein the one or more data products are developed by a domain expert, and wherein the one or more data products implement custom code for performing one or more functions.

17. A non-transitory computer-readable medium storing instructions that, when executed by one or more processors of a computing system, cause the computing system to perform operations, the operations comprising:

building a data product pipeline using a wellsite operations data foundation (WODF), wherein a data product developer creates and implements changes to the data product pipeline, wherein a WODF developer prepares elements that are to be used by the data product developer, wherein a data product operator maintains a model of the data product pipeline, and wherein a data product quality assurance (QA) controller tests, identifies, and corrects problems with a functionality of the data product pipeline;

receiving input data from one or more external data sources via the data product pipeline, wherein the input data comprises seismic data and/or downhole data that is captured by a downhole tool in a wellbore of a well, wherein the downhole data comprises measurement-while-drilling parameters and logging-while-drilling parameters, wherein the one or more external data sources comprise an oilfield analytics, planning, and management software, a unified data service, and an open subsurface data universe, and wherein the data product pipeline comprises an extraction pipeline and a transformation pipeline wherein the extraction pipeline comprises:

a source connector configured to modify a format of the input data to generate modified input data;

an extraction component configured to extract a portion of the modified input data to produce extracted data, wherein the extracted data is extracted based upon one or more user-defined parameters; and a raw connector component configured to receive the extracted data and modify the extracted data based on one or more portability parameters to generate modified extracted data;

transferring the modified extracted data from the extraction pipeline to a data product raw storage, wherein the data product raw storage is configured to store the modified extracted data in a common data format (CDF) storage;

storing the input data received directly from the one or more external data sources in the data product raw storage, wherein the data product raw storage is configured to store the input data in the CDF storage;

transferring the modified extracted data and the input data from the data product raw storage to the transformation pipeline of the data product pipeline, wherein the transformation pipeline is configured to:

receive one or more data products from a data product artifact storage, wherein the one or more data products correspond to a pre-defined format associated with a data domain to perform data ingestion, data transformation, data storage, data retrieval, and data output functions using one or more application programming interfaces (APIs) associated with the data domain;

transform the input data and the modified extracted data into transformed data based on the one or more data products; and transfer the transformed data to the data product artifact storage;

determining one or more properties associated with the wellbore in a subsurface region of the earth based on the transformed data; and adjusting one or more functional operations of equipment associated with the wellbore based on the one or more properties, wherein the one or more functional operations of the equipment are adjusted to vary a torque on a drill bit drilling the wellbore.

18. The non-transitory computer-readable medium of claim 17, wherein the operations further comprise displaying the transformed data to a user.

19. The non-transitory computer-readable medium of claim 17, wherein the one or more functional operations comprise generating and transmitting a signal that instructs or causes a physical action to occur at a wellsite associated with the wellbore.

20. The non-transitory computer-readable medium of claim 19, wherein the physical action comprises selecting where to drill the well, drilling the well, varying a weight on a drill bit that is drilling the well, varying a drilling trajectory of the well, or varying a concentration and/or flow rate of a fluid pumped into the well.

* * * * *